United States Patent [19]

Brown et al.

[11] 3,917,490

[45] Nov. 4, 1975

[54] METHOD OF GRINDING SOLDER GLASSES

[75] Inventors: William E. Brown, Walnut Creek; Charles A. Levine, Clayton; Floris Y. Tsang, Concord, all of Calif.

[73] Assignee: The Dow Chemical Company, Midland, Mich.

[22] Filed: Dec. 23, 1974

[21] Appl. No.: 535,250

[52] U.S. Cl. .................................. 136/6 F; 65/42
[51] Int. Cl.² ........................................ H01M 35/00
[58] Field of Search .......... 106/47 R; 65/18, 42, 43, 65/61; 26/4–109, 125; 136/6 F, 6 FS

[56] References Cited
UNITED STATES PATENTS 3,404,035  10/1968  Kummer et al .................... 136/6 FS
3,476,602  11/1969  Brown et al. ...................... 136/6 FS
3,594,144   7/1971  Acello ................................... 65/43
3,679,480   7/1972  Brown et al. ...................... 136/6 FS
3,749,603   7/1973  Stringham et al. ................. 136/6 F
3,758,337   9/1973  Fally et al .......................... 136/6 FS Primary Examiner—John H. Mack
Assistant Examiner—C. F. Lefevour
Attorney, Agent, or Firm—Robert R. Stringham

[57] ABSTRACT

Low melting glasses, such as high borate glasses (94% $B_2O_3$ and 6% $Na_2O$ for example) cannot be fine ground by ordinary methods. They can be ground, however, at elevated temperatures in the presence of certain high boiling amines.

15 Claims, No Drawings

METHOD OF GRINDING SOLDER GLASSES

BACKGROUND OF THE INVENTION

The present invention was made under the course of U.S. Government Research Contracts, NASA Contract No. NAS-3-16806 and ARPA Contract No. DAHC-15-73-C-0254.

Solder glasses are low melting glasses. They are usually supplied in the form of finely divided powders which are suspended in a liquid to form a viscid slurry or paste. The paste is applied to a substrate, the liquid vehicle evaporated and the temperature then raised to melt and fuse the glass particles into a coherent, amorphous body of glass of a desired configuration.

In order to make the strongest possible fused solder glass, the solids to liquid ratio in the glass powder suspension should be as high as possible. This is done by adjusting the particle size distribution of the powders used, according to known principles of particle packing. Some of the powder must be very fine — definitely less than 10 microns in particle diameter — for the best results in fusion. With most glasses, these fine particles can easily be made by ball-milling. The powder is placed in ceramic cylinders containing ceramic or metal grinding balls. The cylinders are rotated and the glass particles are broken down to finer and finer particles as the grinding is prolonged. Sometimes a liquid and/or surface active agent is added to facilitate the milling.

With high borate glasses (94% $B_2O_3$ and 6% $Na_2O$, for example) such ordinary grinding procedures do not work. After ball milling for as long as 7 or 8 days, even with liquids or surface active materials, electron micrographs of the particles show that the requisite finer sizes are not attained. Ball-milling at −78°C. (attempting to make the glass more brittle) also fails to give adequate particle size reduction.

A solder glass application of particular importance is in the fabrication of high temperature batteries. Exemplary of such batteries are those employing molten alkali metals and sulfur/sulfide solutions as anode and cathode respectively. See, for example, U.S. Pat. Nos. 3,476,602; 3,404,035; 3,672,944 and 3,514,332. For examples of different types of high temperature batteries, see U.S. Pat. Nos. 3,437,524 and 3,031,518.

Other applications of solder glasses are in sealing capacitors (exemplified by U.S. Pat. No. 3,770,404) and in joining components of colored TV picture tubes with an electrically conducting, gas tight seal (see U.S. Pat. No. 3,391,055).

U.S. Pat. Nos. 3,476,602; 3,765,944 and 3,791,868 relate to a form of alkali metal/sulfur battery cell in which the electrolyte takes the form of a large number of closely spaced, alkali metal cationconductive capillary glass tubules or fibers. A generally cylindrical container for the catholyte ($Na_xS_y$, for example) and a generally cylindrical reservoir for the anolyte ($Na^o$, for example) are abutted against and joined in sealing arrangement to an intervening, horizontal, electrically non-conducting "tube sheet" disc. Fine, hollow glass fiber lengths having their lower ends closed and their upper ends open pass through the tube sheet in sealing arrangement therewith. The open ends of the fibers communicate with the molten alkali metal in the anolyte reservoir and the portions of the fibers dependent from the tube sheet are immersed in the molten catholyte. The U.S. Pat. No. 3,791,868 describes a method of forming such a cell in which the glass fiber lengths are arrayed in parallel on a metal foil strip and a band of a curable paste is deposited on and between the fibers adjacent their open ends. The foil and fibers are then rolled into a bundle and the paste cured to form the tube-sheet. The foil is employed as the cathodic current collector in the cell.

Materials suitable for use as the tube sheet in such a cell must be amenable to formulation as a paste or slurry of adequate solids content which can be "cured" and fused at a temperature below the softening temperature of the glass in the fibers. The material, when cured, must bond to the fibers and form an integral member impenetrable by and chemically resistant to the molten anolyte and catholyte. Bonding with the fibers is dependent upon their composition. Also, expansion coefficients must match well.

U.S. Pat. No. 3,829,331 describes a sodium borate/sodium halide glass composition which is suitable for hollow glass fibers in sodium/sulfur battery cells. Sodium borate solder glasses having a high $B_2O_3$ content have been found satisfactory as tube sheet materials for use in conjunction with fibers of the type described in the U.S. Pat. No. 3,829,331. However, as explained earlier herein, the utility of such solder glasses depends upon being able to grind them sufficiently fine. Conventional grinding methods are not effective for this purpose.

SUMMARY OF THE INVENTION

It has now been discovered that high borate, alkali metal borate solder glasses can be effectively ground if certain amines are mixed with the glass particles and elevated grinding temperatures are employed.

More precisely, the present invention may be defined as follows.

A process for grinding alkali metal borate glasses of high borate contents which comprises:

1. providing particles of an alkali metal borate solder glass having effective diameters of at least 2 microns and consisting essentially of boron trioxide and sodium oxide, potassium oxide or a mixture thereof; the content of boron trioxide in said glass being from about 90 to about 98 wt. %;

2. grinding said particles, while contacting them with an aliphatic amine, at a temperature at which the vapor pressure of the amine is at least 1 mm Hg but less than the alteration temperature of the amine or the softening point of the glass, whichever is lower, until at least some of said particles have been converted to fragments thereof which have effective diameters of less than one micron and are coated with at least a monomolecular layer of the amine, said amine containing at least one chain of at least 12 carbons and a total of up to 42 carbons.

Preferably, the grinding is continued until the solids present constitute a powder including at least 20 volume % of particles having effective diameters of less than 1 micron.

In a narrower aspect, the present process additionally comprises mixing from about 40 to about 60 parts by weight of said powder with about 60 to about 40 parts of −200 to +325 mesh particles of a glass miscible therewith upon fusion and from about 7 to about 14 parts by weight of a volatilizable non-aqueous liquid suspending vehicle to form a paste, shaping the paste, curing it by heating it and volatilizing said liquid vehicle and fusing the residual solids, thereby forming a unitary glass body. Preferably, the −200 to +325 mesh particles consist of the same glass as the ground powder.

In a still narrower aspect, the present process additionally comprises so disposing said paste that the unitary glass body formed upon said curing and fusing constitutes a tube sheet member in or adapted to be incorporated in a high temperature battery cell in which the electrolyte/separator consists of a glass to which said solder glass will bond.

In a preferred embodiment, the electrolyte/separator in the high temperature battery cell is in the form of a plurality of hollow fibers.

In the foregoing definition of the invention, the term "alteration temperature" means the lowest temperature at which 50% of the amine is decomposed, oxidized or otherwise chemically altered after 10 days under the grinding conditions employed. In other words, it is the temperature at which the amine has a half-life of at least 10 days in the grinding environment.

The chemical alteration referred to of course does not include whatever interaction is involved between the amine and the surfaces of the glass particles. By the softening point of the glass is meant the glass transition temperature, $t_g$.

DETAILED DESCRIPTION OF THE INVENTION

Suitable solder glasses for the practice of the present invention are those consisting essentially of boron trioxide ($B_2O_3$) and an alkali metal oxide ($Na_2O$, $K_2O$ or a mixture thereof). The content of $B_2O_3$ should be within the range of from about 90 to about 98 wt. %, the balance being the alkali metal oxide(s) with such minor or incidental amounts of other materials that the essential character of the material as a solder glass is not lost. Preferably, the amount of impurities included is less than 0.1 wt.% of the total.

Within the foregoing limits, the composition of the solder glass may be varied in order to modify such properties as melting or softening temperature, coefficient of expansion and bondability to other materials. Thus, for example, a glass consisting of $B_2O_3$ (94 wt. %) and $Na_2O$ (6 wt. %) has a melting point well below the softening point of the glass hollow fibers disclosed in U.S. Pat. No. 3,829,331, bonds well to such fibers and provides an adequate match in expansion coefficients thereto.

For example, the 94% $B_2O_3$/6% $Na_2O$ glass employed in Example 4 herein to make a tube sheet in a hollow fiber sodium/sulfur cell has a glass transition temperature of about 335°C. and an expansion coefficient (measured for the range 0°–300°) of about ($111 \times 10^{-7}$)/°C. The fibers used had an expansion coefficient of about ($119 \times 10^{-7}$)/°C. and a glass transition temperature of about 440°C.

SIZE AND SHAPE OF PARTICLES TO BE GROUND

The present grinding process is unique in being able to effect a further size reduction in particles of high borate solder glasses which are already 2 microns or less in effective diameter. However, larger particles may first be reduced in size to diameters of about 2 microns in a preliminary grinding operation and a benefit will generally be realized from the presence of the amine during this stage. Clumping together of the glass particles apparently occurs in the absence of the amine at sizes ranging all the way from 1 micron, or less, up to about 50 microns.

The solder glass particles to be ground do not have to be uniform in size or of any particular shape. It is only necessary that they be grindable in whatever mill may be available.

GRINDING MEANS

Any suitable ball, rod or other type of mill may be employed. Preferably, a mill capable of retaining vapors of the amine and any other liquid present in the grinding mix is used. Means for maintaining the mix at the grinding temperature — which may range from as low as 50°C. up to several hundred degrees, depending on the particular amine and/or any diluent employed — will be required.

AMOUNT OF AMINE REQUIRED

The present invention is not predicated on any understanding of the mechanism by which the amine interacts with the glass particles. However, it is believed that the amine molecules attach to the acidic particle surfaces through the free electron pair on the amine nitrogen and the dependent carbon chain(s) act to keep the particles from approaching so closely that reaggregation will occur under the pressure exerted in the grinding action. Thus, it is essential to efficient grinding that the activity of the amine in the mix be maintained at a high enough level so that any freshly formed particle surface will encounter and interact with enough amine molecules to be "insulated" from direct interaction with other particle surfaces. Less than the amount of amine required to form a mono-molecular layer may suffice but this has not been established. The latter amount represents only a small amine requirement in the mix and can be estimated closely, by known methods, from the specific surface corresponding to any given (desired) particle size distribution in the powdered product.

Better results, i.e., a higher proportion of particles less than 1 micron in diameter and better suspendability, are obtained in a given grind period if more than the amount of amine required to provide a monomolecular layer on the product powder particles is used. In general, amounts of amine ranging from about 0.5 to 2.5% of the weight of the glass particles charged to the grinder will be found suitable. Much higher amounts can of course be employed but removal of the excess will generally be necessary after grinding. Amounts within the range of about 1 to about 2 wt. % are preferred.

GRINDING TEMPERATURES

The requisite amine activity in the vapor phase is assured by providing enough amine for at least a monomolecular layer and by operation at a grinding temperature at which the amine has a vapor pressure of at least 1 mm Hg. If the amine is employed with another liquid, the mole fraction of amine in the liquid phase and the temperature must be high enough so that it is the partial pressure of the amine which is at least 1 mm. This is so, even if the amine constitutes or is part of a body of liquid in which the solid phase is continually immersed.

As indicated earlier herein, grinding temperatures high enough to provide an amine vapor pressure of at least one mm Hg but low enough to avoid an intolerable degree of amine alteration or glass softening will generally range from about 50°C. to as high as about 300°C. However, temperatures greater than 80°C. but below the boiling point of the amine(s) at 760 mm Hg are preferred. The best results obtained have been at temperatures of from about 80° to about 100°C.

DILUTION OF THE AMINE

Preferably, the amines (singly or in admixture) are employed neat, i.e., undiluted, as a minor component of the grinding mix but at a sufficient temperature to establish the requisite amine activity in the vapor phase. The amines above specified for use in the present process do not exert vapor pressures of at least 1 mm Hg at temperatures below their melting points. Thus, the preceding definition does not encompass the use of these amines in the solid phase and elevated temperatures are necessarily required even when an amine constitutes all of a liquid phase in which the glass particles are immersed while being ground. Also, elevated temperatures are believed to activate the particle surfaces and thereby speed up the reaction with the amine.

The amine(s) may also be employed as a dispersion or solution in an inert diluent. By "inert" is meant that the diluent does not effectively compete with the amine for the acidic particle surfaces, or with the surfaces for the amine, and does not otherwise detrimentally effect the process. In general, non-polar materials which are liquids or form liquid solutions with the amines and are relatively non-volatile at the selected grinding temperature are preferred. Advantageously, a diluent is used which is also suitable as a suspending agent for the final grinding product.

Exemplary of suitable diluents are hydrocarbons, such as toluene, decalin, decane, xylene, kerosene, etc. Cumene is particularly preferred as a suspending medium and accordingly is also a preferred diluent. Chlorocarbons, such as carbon tetrachloride, for example, may be employed as diluents but care should be taken that the grinding temperature is maintained low enough to avoid substantial reaction between the chlorocarbon and the amine. Liquid fluorocarbons, such as perfluorodecane or tetrafluoroethylene telomers, for example, may also be used.

The amount of diluent employed may range from a small fraction of a percent of the amount of the amine to such an amount that the efficiency of the grinding mill is reduced.

The preceding two embodiments of the invention, in which the glass particles are ground while immersed in a liquid phase consisting of or containing the amine(s), require an additional operation in which the solid phase is separated (as by such conventional procedures as centrifuging) and are less preferred.

SUITABLE AMINES

Suitable amines for the practice of the present process are aliphatic amines, $NR^1R^2R^3$, wherein $R^1$ is an alkyl or alkenyl group containing a chain of at least 12 carbons and $R^2$ and $R^3$ independently are hydrogen or are alkyl or alkenyl groups containing from 1 to 20 carbons, but with the restriction that the total number of carbons is not more than 42.

Amines of the preceding formula in which $R^1$ contains a chain of 15 to 20 carbons and wherein the total number of carbons is from 15 to 24, not only are more effective in coating freshly exposed particle surfaces during grinding but also provide coated particles which interact more effectively with non-polar liquid suspending media which may subsequently be used to make extrudable pastes or slurries of maximal solids contents. Accordingly, the latter group of amines are preferred for the practice of the invention.

A particularly effective sub-class within this group are amines of the preceding formula wherein $R^1$ is an alkyl or alkenyl group of 16, 17 or 18 carbons and $R^2$ and $R^3$ independently are H or methyl.

Hexadecylamine, $CH_3(CH_2)_{14}CH_2NH_2$, and dimethyl octadecyl amine, $CH_3(CH_2)_{16}CH_2N(CH_3)_2$ have been found to be outstandingly effective.

PRESSURES

The grinding operation of the present invention may be carried out at pressures ranging from sub-atmospheric to super-atmospheric. Atmospheric pressure is convenient and is preferred. Sub-atmospheric pressures will be most suitably employed with relatively non-volatile amines and diluents and will generally be greater than 1 mm Hg. Temperatures above the atmospheric boiling point of the amine or amine/diluent mixture will require operation under at least autogenous pressures.

GRINDING TIMES

Grinding is continued until whatever proportion desired of the glass particles have effective diameters of less than 1 micron. The time required to convert the particles charged to the grinder to a product powder of a particular size distribution can readily be determined in pilot tests wherein samples of the grinding mix are removed at successive stages of grinding and examined under a scanning electron-microscope. However, as a general guide, powders which may be utilized in their entirety to make high solids content pastes can be produced by grinding periods as short as about 2 days, provided 1% or more of one of the more effective amines, such as hexadecyl amine or dimethyl octadecylamine is used at a grinding temperature of about 100° and provided that the glass particles have already been ground with an amine of the specified types for 7 days or more (not necessarily at an elevated temperature). On the other hand, grinding may be prolonged indefinitely and the duration of grinding is limited only by practical considerations. Preferably, grinding is discontinued when it becomes apparent that the volume fraction of sub-micron particles is increasing asymptotically, i.e., when not much difference is seen between two samples taken eight or more hours apart. Emperically, grinding times of from about 7 to about 10 days have been found desirable.

MODES OF OPERATION

Grinding does not have to be accomplished in a single, continuous operation or with the same amine(s) or diluents throughout. For example, it may be advantageous to carry out most of the grinding with one amine and then to remove any excess thereof and "finish" grind with another amine. Many other variations within the ambit of the present invention will be apparent to those skilled in the art.

SUSPENDING MEDIA

Cumene (isopropyl benzene) is the preferred suspending agent for the preparation of extrudable, high-solids pastes from the product powders produced by the present grinding process. It effectively wets the amine-coated glass particles and is readily removed by heating. Other non-aqueous liquids which are generally suitable suspending agents are exemplified by toluene, xylene, cyclohexanone, nitrobenzene and dodecane. The suitability of any specific liquid as a suspending vehicle is of course easily determinable by a direct test. However, as a general guide, the following desiderata may be mentioned.

The vehicle should wet the amine coated particles well. This can be estimated in advance on a macro scale by coating a flat surfaced piece of the glass (to be ground) with a thin film of the amine which will be used and then applying drops of the vehicle and measuring the wetting angle by conventional methods. An angle of 10° or less can be considered as indicative of adequate wetting.

The vehicle should be inert, i.e., at least not detrimentally reactive with any of the materials it will encounter in use. Aqueous liquids and highly hygroscopic liquids are ruled out because water does detrimentally effect the glass. The vehicle should also be volatile, i.e., — volatilizeable from the shaped paste at a convenient maximum temperature such as 200°C., reduced pressure preferably not being required.

EXAMPLES

EXAMPLE 1 a. —325 Mesh particles of a high borate glass containing 94 weight percent $B_2O_3$ and 6% $Na_2O$ were ball-milled for 8 days and electron micrographs of the resulting powder prepared. It was apparent from the micrographs that no substantial proportion of sub-micron particles had been formed and that clumping of smaller particles with each other and with larger particles had occurred.

b. No significant improvement resulted when the grinding operation was repeated at a temperature of —78°C. (dry ice present throughout the grinding period).

c. Similar results were obtained when the grind at room temperature was repeated with the addition of 1% by weight of hexadecylamine.

d. Elevating the grinding temperature to 90° in the absence of any amine also was ineffective.

e. However, after only 7 hours grinding at 90° with 1% of hexadecyl amine, it was evident that a considerable improvement had been effected. The specific volume of the ground powder (ratio of measured volume of known weight of the powder, compacted by tapping container lightly on bench top, to weight) was 1.4 cc/gram, as compared to 2 cc/gram for the —325 mesh starting particles. Two grams of the ground powder, when mixed with 0.4 grams of cumene, gave a sticky but very fluid paste. In contrast, the starting particles, after refluxing with hexadecyl amine in toluene and drying gave only a dry crumb at the same mixing ratio with cumene. After 13 hours more of grinding with the amine at 90°, a sample of the ground powder was mixed in the amount of two grams with 2 grams of glass spheres (94% $B_2O_3$/6% $Na_2O$; narrow size range around —250 mesh) and 0.4 grams of cumene and gave an almost extrudeable paste.

f. A fresh batch of feed particles of the same composition and particle size range was ground 48 hours at 90° with 1% hexadecyl amine. Two grams of the ground powder, with 2 grams of the same glass spheres and 0.4 gram of cumene gave a paste that was extrudeable, with some blocking. Plaques of the ground powder fused when heated 1½ hours at 408°C. Plaques heated at 350°C. were just barely fused.

g. Starting material of the type used in the preceding tests is prepared by an initial grind of coarse particles in a parallel plate mill, followed by at least 1 hour in an 8 inch porcelain lined ball mill containing ¾ inch porcelain balls. Toluene or isooctane may be used as a grinding aid in the ball mill. —325 and —200 to +325 mesh portions are separated by sieving.

EXAMPLE 2 a. 110 Grams of 94% $B_2O_3$/6& $Na_2O$, —325 mesh glass particles and 1.1 grams of hexadecyl amine were ground together, at room temperature, in a ball mill for a total of 138 hours. Electron micrographs of samples withdrawn after 19, 43, 115 and 138 hours of grinding were compared. No substantial difference in the proportion or size distribution of the fines (2 microns and up) was discernible after 43 hours. A mixture of 2.5 grams each of the final product powder and glass spheres (see Example 1 (e) ) with 0.5 gram cumene was too dry to extrude.

b. An essentially identical starting material which had been ground 130 hours at 95°C. with 1% hexadecyl amine gave a paste, with the same proportion of spheres and cumene, which was fluid but was not entirely extrudeable. After another 42 hours of grinding at 95°C. (1% hexadecyl amine content) the product powder gave an extrudeable paste in the preceding proportions with the spheres and cumene. Electron microscope examination of a comparable product powder showed at least 20 volume % of sub-micron particles to be present.

EXAMPLE 3

Additional experiments, in which different amines and other candidate grinding agents were tried, were carried out in the manner of the preceding examples. The materials, conditions and results are summarized in Table I. In each test, the glass ground consisted of 94% $B_2O_3$ and 6% $Na_2O$, by weight.

| Test | Agent and Wt. Percent | Grind at 90°C. Stage 1 | Grind at 90°C. Stage 2 | Product Powder Suspendable | Product Powder Extrudable |
|---|---|---|---|---|---|
| a. | Hexadecanol (1.0) | 21 days | — | No | — |
| b. | Hexadecylamine (0.5) +(0.5) | 21 days | +24 hrs. | — Poorly | — — |
| c. | Hexadecylamine (1.0) +(0.75) | 7 days | +18 hrs. | — Yes | — Good |
| d. | Dodecanol (10.0) | 7.5 days | — | No (Caked in mill) | — |
| e. | Benzylamine (1.5) +Hexadecylamine | 6 days | — | No | — Yes, if extra |

-continued

| Test | Agent and Wt. Percent | Grind at 90°C. Stage 1 | Stage 2 | Product Powder Suspendable | Extrudable |
|---|---|---|---|---|---|
| f. | (0.5) Dimethyl octadecyl amine | | +18 hrs. | Yes | cumene used. |
| g. | (1.5) Hexadecyl amine | 10 days | — | Yes | Very good |
|   | (1.5) | 5.5 days | | Yes | Yes |
|   | +(0.5) | | +24 hrs. | Yes | Good |
| h. | p-Dodecyl aniline (1.5) | 6.5 days | | No | — |

EXAMPLE 4

Solder glass particles containing 94 wt. % $B_2O_3$ and 6 wt. % $Na_2O$ were ground 6 days at 90°C. with 1 wt. % of hexadecyl amine, and then another day at 90°C. after 0.5% more of the amine was added. The product powder was mixed with an equal weight of spheres (see Example 1 (c) and suspended with enough cumene (~10 wt. %) to provide an easily extruded paste.

One thousand, 5 cm. lengths of 70 micron O.D., 50 micron I.D. hollow glass fiber, closed at one end only, were disposed in parallel array on a horizontal strip of carbon-coated aluminum foil, about 7.5 cm. wide and 12.5 microns thick, with their axes perpendicular to the foil edges and at a uniform spacing along the foil of about 58 fibers per cm. The open ends of the fibers extended about 0.6 cm. beyond one edge of the foil and the other foil edge extended about 2.6 cm. beyond the closed ends of the fibers. The fibers consisted of a sodium borosilicate glass as described in U.S. Pat. No. 3,829,331.

A spacer strip of aluminum, about 1 cm. wide and 100 microns thick, was laid on top of the foil with its inner edge at a distance of about 1.6 cm. from the closed fiber ends.

A bead of the solder glass paste, about 0.5 cm. wide, was extruded onto the portions of the fibers extending beyond the foil. The foil spacer strip, fiber array and paste bead were then rolled up on a 0.5 × 5 cm. aluminum rod like a rug. The paste was thereby formed into a coherent mass, i.e., an uncured tube-sheet.

The rolled assembly was stood on end with the open ends of the fibers protruding up slightly beyond the body of paste. The roll was heated, in vacuo to 387°C. and kept under those conditions for 1¾ hours, thereby curing and fusing the paste and forming a unitary, non-porous glass tube sheet bonded in sealing relationship with the fibers.

The resulting assembly was then incorporated in a high temperature battery cell — i.e., a sodium sulfur battery cell — as described in U.S. Pat. No. 3,791,868. The anode and cathode leads were connected to an external load circuit and the cell heated to 300°C. Discharge was allowed to proceed until the catholyte composition altered from pure sulfur to a solution of sodium sulfide in sulfur, the external resistance being manipulated so that the discharge rate was gradually increased to about 300 milliamps at a terminal voltage of about 1.9 volts. The cell was then put on automatic cycling so that it alternately charged (2.5 volts applied) and discharged (1.6 volts working potential) at a rate of about 1 ampere, each complete cycle requiring about 40 minutes. This was continued through 214 cycles, after which the cell failed for reasons that had nothing to do with the tube-sheet performance.

EXAMPLE 5

In the manner of Example 2, several grinding tests were carried out on −325 mesh $K_2O/B_2O_3$ glasses.

A. Attempts to grind −325 mesh particles of a 97% $B_2O_3/3\%$ $K_2O$ glass with and without media, such as benzene, hexane, etc., at various temperatures all failed to produce adequate amounts of submicron sized particles for suspendability in cumene.

B. Grind conditions and results for each of three different potassium borate glasses, ground at 90°C. with hexadecyl amine, follow.

| Test | % $B_2O_3$ | % $K_2O$ | % amine in grinding mix | Days Ground | Extrudability of cumene Suspension[1] |
|---|---|---|---|---|---|
| (a) | 97 | 3 | 1.5 wt. % | 7 | Marginal |
| (b) | 94 | 6 | 1.0 | 6 | — |
|   |   |   | +0.5 more | +1 more | Marginal |
|   |   |   | +0.5 more | +1 more | Good |
| (c) | 94.5 | 5.5 | 1.0 | 6 | — |
|   |   |   | +0.5 more | +1 more | Good |

Note: (1)
[1]6 grams of grinding product + 6 grams 94/6 $B_2O_3/Na_2O$ spheres (see Example 1 (e) ) and 1.3 grams cumene.

EXAMPLE 6

−325 Mesh particles of a 91% $B_2O_3/9\%$ $Na_2O$ glass, ground at room temperature with hexadecyl amine, gave a product powder of only marginal suspendability in cumene. At temperatures of 50° or more, this same grinding treatment will give a readily suspendable and extrudable product powder.

We claim:
1. A process for grinding alkali metal borate glasses of high borate contents which comprises:
   1. providing particles of an alkali metal borate solder glass having effective diameters of at least 2 microns and consisting essentially of boron trioxide and sodium oxide, potassium oxide or a mixture thereof; the content of boron trioxide in said glass being from about 90 to about 98 wt. %;
   2. grinding said particles while contacting them with an aliphatic amine, at a temperature at which the vapor pressure of the amine is at least 1 mm Hg but less than the alteration temperature of the amine or the softening point of the glass, whichever is lower, until at least some of said particles have been converted to fragments thereof which have effective diameters of less than one micron and are coated with at least a monomolecular layer of the amine, said amine containing at least one chain of at least 12 carbons and a total of up to 42 carbons.

2. The process of claim 1 wherein the grinding is continued until the solids present constitute a powder including at least 20 volume percent of particles having effective diameters of less than one micron.

3. The process of claim 2 comprising the additional steps of:
 a. mixing from about 40 to about 60 parts by weight of said powder with about 60 to about 40 parts of −200 to +325 mesh particles of a glass miscible therewith upon fusion and from about 7 to about 14 parts by weight of a volatilizeable, non-aqueous liquid suspending vehicle to form a paste;
 b. shaping said paste,
 c. curing said paste by heating it and volatilizing said liquid vehicle,
 d. fusing the residual solids, thereby forming a unitary glass body.

4. The process of claim 3 in which said −200 to +325 mesh particles consist of the same glass as said powder.

5. The process of claim 3 in which said paste is shaped by so disposing it that the unitary glass body formed upon said curing and fusing constitutes a tube-sheet member adapted to be incorporated in a high temperature battery cell in which the electrolyte/separator consists of a glass to which said solder glass will bond.

6. The process of claim 5 including, as an additional step, incorporating said tube-sheet member in a high temperature battery cell.

7. The process of claim 1 wherein the solder glass consists essentially of $B_2O_3$ and $Na_2O$ and contains about 94 wt. % of $B_2O_3$.

8. The process of claim 1 in which said amine has the formula $R^1R^2R^3N$, wherein $R^1$ is an alkyl or alkenyl group containing a chain of 15 to 20 carbons, $R^2$ and $R^3$ independently are H or are alkyl or alkenyl groups and the total number of carbons is from 15 to 24 and the weight of said amine present in the grinding mix is from 0.5 to 2.5 % of the weight of the glass particles present.

9. The process of claim 1 in which the grinding temperature is greater than 80°C. but less than the boiling point of the amine at 760 mm Hg.

10. The process of claim 7 in which $R^1$ is an alkyl or alkenyl group of 16, 17 or 18 carbons and $R^2$ and $R^3$ independently are H or methyl.

11. The process of claim 9 in which the weight of the amine employed is from about 1 to about 2% of the weight of the glass particles present in the grinding mix and the amine is hexadecyl amine or dimethyl octadecyl amine.

12. A high temperature battery cell produced by the process of claim 6.

13. An alkali metal/sulfur battery cell produced by the process of claim 6.

14. A high temperature battery cell of claim 12 in which the electrolyte/separator is in the form of a plurality of hollow fibers.

15. A cell of claim 14 which is an alkali metal/sulfur battery cell.

* * * * *